(12) United States Patent
Sardella

(10) Patent No.: US 8,418,834 B2
(45) Date of Patent: Apr. 16, 2013

(54) PREFEEDING CORRUGATED BOARDS TO BOX FINISHING MACHINES

(75) Inventor: Louis M. Sardella, Crystal Bay, NV (US)

(73) Assignee: Sun Automation, Inc., Sparks, MD (US)

( * ) Notice: Subject to any disclaimer, the term of this patent is extended or adjusted under 35 U.S.C. 154(b) by 400 days.

(21) Appl. No.: 12/804,573

(22) Filed: Jul. 26, 2010

(65) Prior Publication Data

US 2012/0020766 A1    Jan. 26, 2012

(51) Int. Cl.
 *B65G 59/02*    (2006.01)
(52) U.S. Cl.
 USPC ............... 198/457.02; 198/415; 414/796.8; 414/796.4
(58) Field of Classification Search ........... 198/414, 198/415, 418.9, 456, 457.02, 468.8; 414/796.4, 414/796.7, 796.8, 798.2; 193/12, 27
 See application file for complete search history.

(56) References Cited

U.S. PATENT DOCUMENTS

| | | | | |
|---|---|---|---|---|
| 4,067,456 A * | 1/1978 | Schmitt | ......................... | 414/792 |
| 4,993,915 A * | 2/1991 | Berger et al. | ............... | 414/796.9 |
| 5,135,351 A * | 8/1992 | Rathert | ....................... | 414/789.5 |
| 5,141,095 A * | 8/1992 | Kamp | ........................... | 198/409 |
| 5,293,984 A * | 3/1994 | Lucas | ........................... | 198/414 |
| 5,462,401 A * | 10/1995 | Brizzi et al. | .................. | 414/797 |
| 5,464,202 A * | 11/1995 | Capdeboscq | .................... | 271/11 |
| 5,706,929 A * | 1/1998 | Easton | ........................... | 198/415 |
| 5,924,548 A * | 7/1999 | Francioni | ..................... | 198/415 |
| 6,173,828 B1 * | 1/2001 | Leu et al. | ....................... | 198/416 |
| 6,464,065 B2 * | 10/2002 | Herubel et al. | ............. | 198/460.1 |
| 6,648,587 B1 * | 11/2003 | McMunigal et al. | ......... | 414/800 |
| 6,851,912 B1 * | 2/2005 | Zahn | ............................. | 414/404 |
| 7,178,800 B2 * | 2/2007 | Stauber | ......................... | 271/189 |
| 7,452,179 B2 * | 11/2008 | Boriani et al. | ................ | 414/801 |
| 7,694,709 B2 * | 4/2010 | Kaagman et al. | ............. | 156/360 |
| 7,703,264 B2 * | 4/2010 | Giuliani | ........................ | 53/446 |

* cited by examiner

*Primary Examiner* — Douglas Hess
(74) *Attorney, Agent, or Firm* — William E. Mouzavires

(57) ABSTRACT

Method and apparatus for prefeeding corrugated boards to a box finishing machine wherein a stack of rectangular boards are moved to a first conveyor with the long dimension of the boards extending transverse to the direction of movement of said first conveyor. The stack is then rotated to place the long dimension of the boards in alignment with the direction of movement of said first conveyor, and then moving the rotated stack to a second conveyor for feeding to a box finishing machine with the long dimension of the boards in alignment with the direction or path of movement of the boards through the box finishing machine. The stack is transferred to the first conveyor from an elevator which contains a supply of boards larger than the stack. Three different types of apparatus are disclosed for rotating the stack. One is a plurality of conveyor belts whose speeds may be varied to rotate the boards. Another is a turntable with a set of belt conveyors and a set of rollers. The third is a vertical chute whose guides rotate the boards as they descend through the chute.

22 Claims, 5 Drawing Sheets

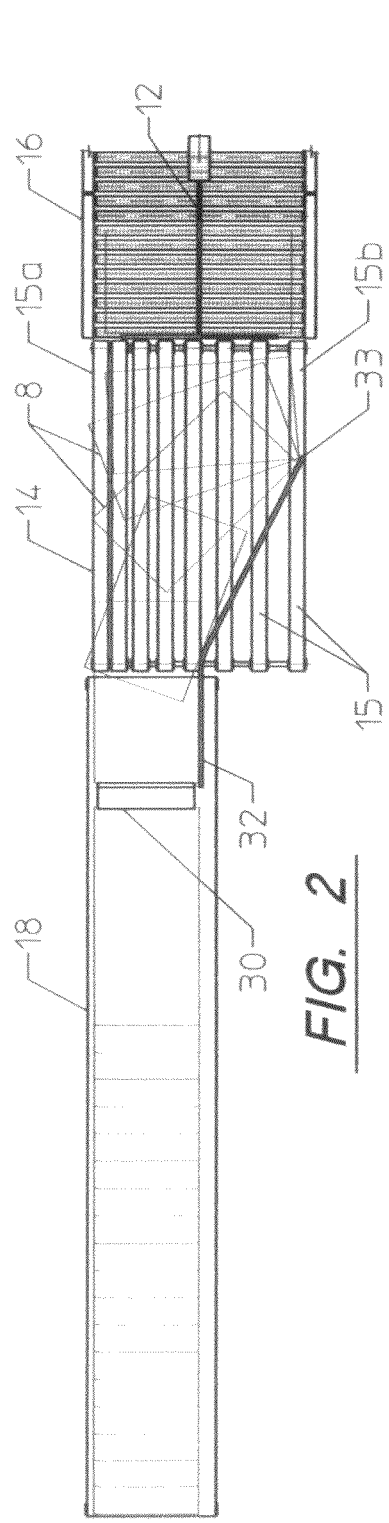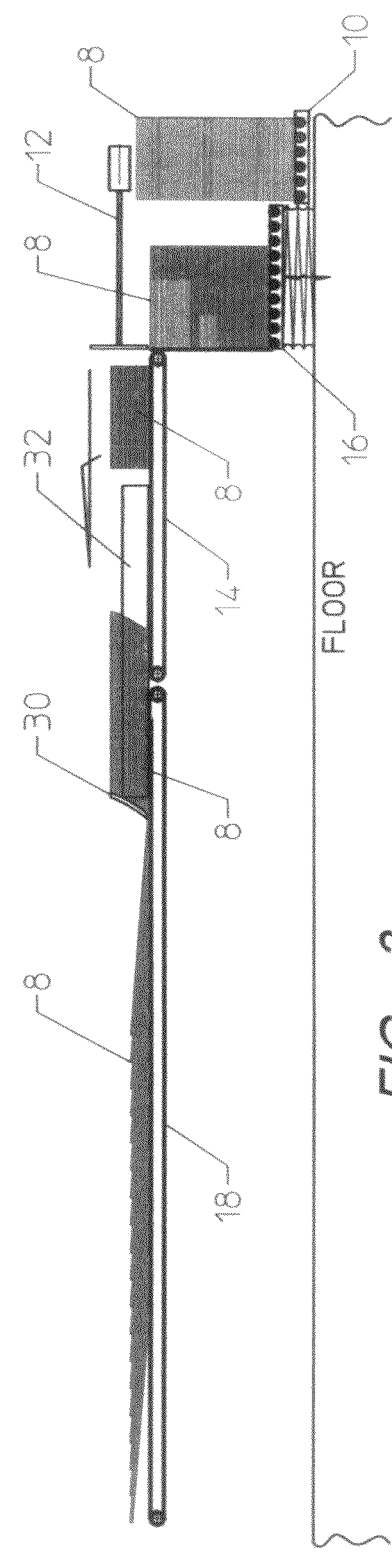

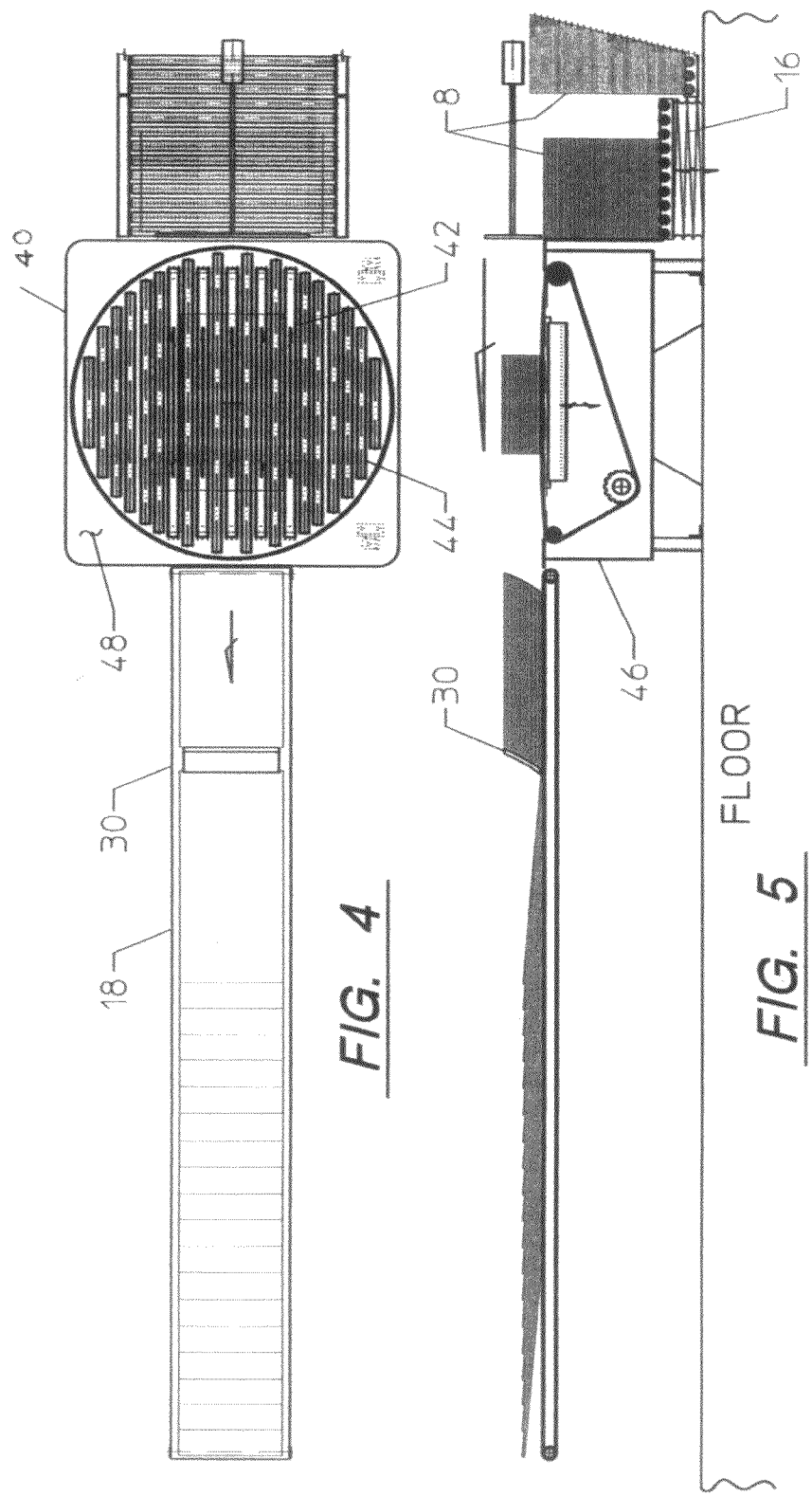

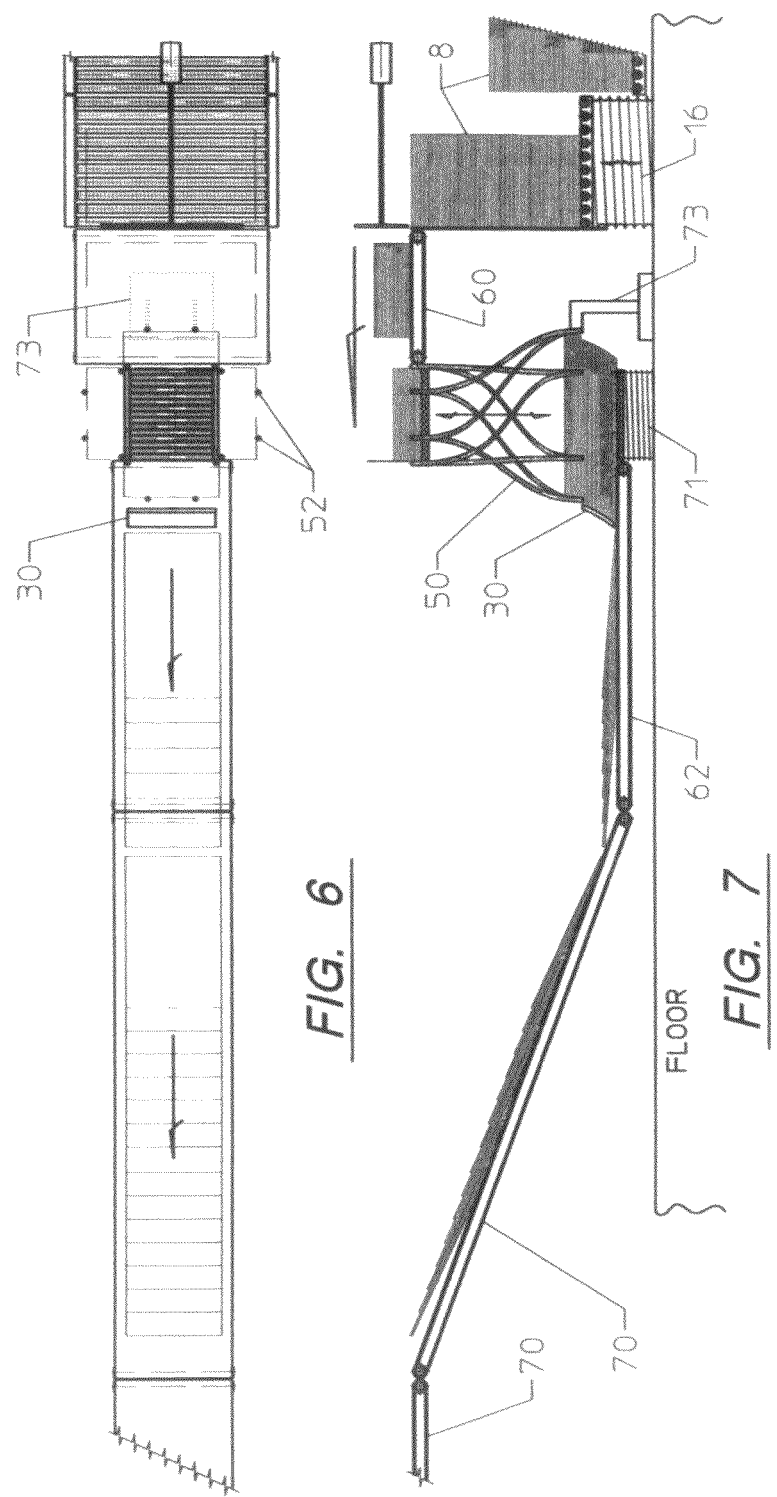

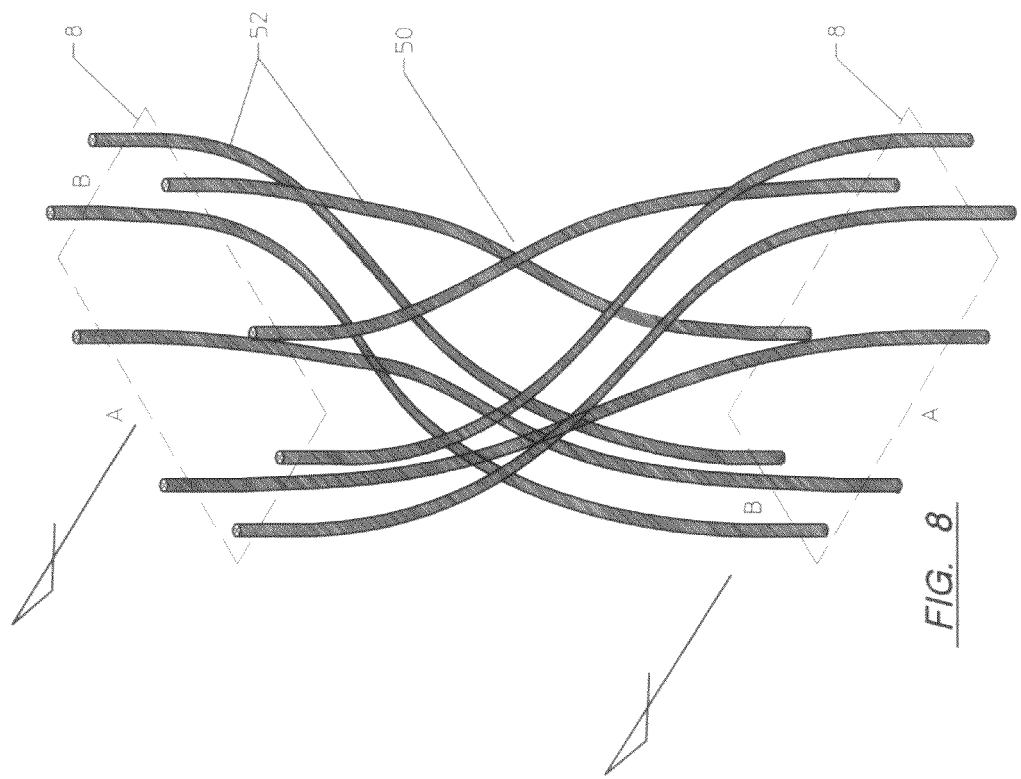

PREFEEDING CORRUGATED BOARDS TO BOX FINISHING MACHINES

BACKGROUND OF INVENTION

The present invention relates to method and apparatus for prefeeding corrugated boards to a box finishing machine. Although the present invention is particularly suitable for feeding corrugated boards, the present invention should be applicable to feeding other types of sheet material. Prefeeders, also called block feeders or load feeders, are well known in the corrugated box industry for feeding six foot tall stacks of sheets into the hopper of a finishing machine such as a flexo printer, a rotary die cutter, a platen die cutter, a printer slotter, or a flexo folder gluer. Prefeeders are generally made to handle a range of rectangular sheets where generally the short dimension of the sheets extends in the direction of flow and the long dimension is transverse to the direction of flow. Prefeeders are made this way because most finishing machines are also built to process rectangular sheets with the long dimension transverse to the direction of flow.

An inkjet printer, also known as a digital printer, for corrugated sheets prints along a path transverse to the direction of flow of the sheets. Such printers are sometimes called narrow path printers. A prefeeder for such a machine needs to feed rectangular sheets into the hopper in two modes. When the long dimension of the sheet is greater than the length of the print bath, the rectangular sheets need to be fed into the hopper with their long dimension in the direction of flow. However, if the long dimension of the rectangular sheets is less than the length of the print path, then the sheets should be fed into the hopper in the conventional manner with their long dimension transverse to the direction of flow. Other finishing machines, such as the narrow path flexo printer or rotary die cutter, may also need such a prefeeder.

There is a need in the corrugated box industry for methods and apparatus for feeding sheets into a narrow path printer or other box finishing devices which take advantage of the developed technology of conventional prefeeders which input six foot tall stacks of corrugated sheets in a box plant in the conventional manner of flow; that is, with the long dimension of the rectangular sheets in the stack transverse to the direction of flow. The present invention provides this need.

OBJECT OF THE PRESENT INVENTION

An object of the present invention is to provide novel methods and apparatus for feeding sheets to a box finishing machine from a stack of sheets.

A further object of the present invention is to provide novel methods and apparatus for feeding rectangular sheets to a box finishing machine in either of two orientations depending on the orientation of box finishing devices, such as for example a digital printer, and/or a rotary die cutter included in the box finishing machine.

Another object of the present invention is to provide novel methods and apparatus for feeding sheets of corrugated boards from conventional supply hoppers or stacks of corrugated boards to conventional box finishing machines without requiring modification of the aforementioned conventional supply hoppers or machines.

SUMMARY OF PREFERRED EMBODIMENTS OF THE PRESENT INVENTION

One preferred embodiment of the present invention, a stack of rectangular corrugated boards on an elevator is delivered to a first conveyor by moving the boards in one direction from the elevator to the conveyor with the long dimension of the boards extending transverse to said one direction. In the situation where the long dimension of the board is greater than the length of the printing path of the digital printer of the box finishing machine which awaits the boards downstream, the boards must be rotated ninety degrees (90°) to orient the long dimension of the boards into said one direction which is aligned with the direction of flow of said box finishing machine. The first conveyor has rotating means for rotating the boards ninety degrees about a vertical axis to orient the boards with their long dimension extending in said one direction. The conveyor delivers the boards to a second conveyor which feeds the boards into the hopper of a box finishing machine with their long dimension extending in said one direction and in the direction of flow of the box finishing machine.

However in situations where the long dimension of the boards is less than the length of the printing path of the digital printer, the rotating means of said first conveyor is not rotated so that the orientation of the boards is maintained without change and the boards are eventually fed to the digital printer with their long dimension extending transverse to the direction of flow of the box finishing machine. In accordance with the present invention several different types of mechanisms described may be employed at the first conveyor to rotate the boards.

DRAWINGS

Other objects and advantages of the present invention will become apparent from the following more detailed description taken in conjunction with the drawings in which:

FIG. 2 is a plan view of a prefeeding system constituting one preferred embodiment of the present invention;

FIG. 3 is an elevational view of the system of FIG. 2;

FIG. 4 is a plan view of a prefeeding system constituting another preferred embodiment of the present invention;

FIG. 5 is an elevational view of the system of FIG. 4;

FIG. 6 is an elevational view of a prefeeding system constituting another preferred embodiment of the present invention;

FIG. 7 is an elevational view of the system of FIG. 6; and

FIG. 8 is a diagrammatic view showing how the corrugated boards are rotated by a chute included in the prefeeder of FIGS. 6 and 7.

DETAILED DESCRIPTION

Figure 1:
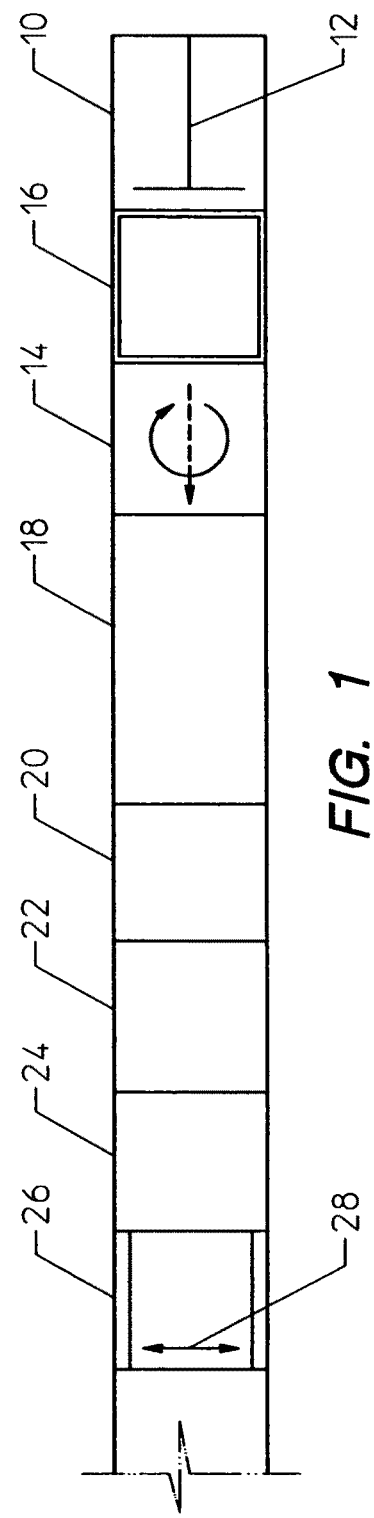
FIG. 1 is a schematic view of a system incorporating the present invention for finishing corrugated boards for boxes including supply hopper, elevator, prefeeders and a finishing machine.

Referring to the drawings in detail there is schematically shown in FIG. 1 for illustrative purposes only, a system for finishing corrugated boards for boxes including a supply hopper 10 from which a stack of corrugated boards are stacked on an elevator 16 from which the boards are moved by a pusher 12 to a first prefeeder conveyor 14. As shown in FIG. 2 the boards 8 are rectangular and are oriented with their long dimension transverse to their path of flow through the elevator to conveyor 14. Depending on the length of the long dimension of the boards 8 in relation for example to the length of the print path 28 of the digital printer 26 included in the box finishing machine 24, the boards 8 may have to be rotated ninety degrees (90°) about their vertical axis while on conveyor 14 to orient the long dimension to extend in the direction of their flow path through the digital printer 26. As will be described below conveyor 14 has means for rotating the stack ninety degrees to so orient the boards 8. From conveyor 14 the boards travel to another prefeeder or exit conveyor 18 where they are transported in shingled relationship as shown in FIGS. 2 and 3 to a hopper 20 which receives the boards in stacked relationship. From hopper 20 the boards are fed one by one by a feeder 22 to the box finishing machine 24 where the boards are printed by digital printer 26 and then slotted, creased and/or scored by devices (not shown) located downstream of printer 218. Feeder 22 may be any suitable feeder but preferably it is the Extend-O-Feed® feeder such as disclosed in U.S. Pat. No. 5,184,811 whose disclosure is hereby incorporated by reference into the subject application.

FIGS. 2 and 3 Embodiment

Referring to FIGS. 2 and 3 there is shown a stack of boards 8 taken from a supply hopper 10 and placed on an elevator 16. Elevator 16 is raised to register a portion of its stack with a first prefeeder conveyor 14 whereupon the stack is transferred to conveyor 14 by pusher 12. Conveyor 14 includes a plurality of elongated endless conveyor belts 15 which are individually driven by a suitable, associated motor so that in one mode, when all of the belts 15 are driven at the same speed, the boards are conveyed by the belts 15 with the long dimension of the boards 8 extending transverse to the flow path of the conveyor 14. Boards 8 are conveyed to a gate 30 overlying the inlet end of a second prefeeder conveyor 18 such that the boards 8 are conveyed one by one beneath gate 30 and are overlapped or shingled on conveyor 18 as shown in FIGS. 2 and 3. Conveyor 18 then feeds the boards 8 to a hopper 20 from which they are fed to a box finishing machine 24 by a feeder 22.

Finishing machine 24 includes a one pass digital printer 24 whose print path 28 (see FIG. 1) extends transverse to the flow path of the boards on the finishing machine. If the long dimension of boards 8 is greater than the length of the print path 28, it is necessary that the long dimension of the boards extend in the direction of the flow path. Hence it is necessary that the boards 8 be rotated ninety degrees (90°) before they reach printer 26. In accordance with the present invention, in one mode of operation, boards 8 are rotated ninety degrees about their vertical axis, at the conveyor 14. In the preferred embodiment of FIGS. 2 and 3 this is effected by driving the belts 15 at different speeds to cause the stack of boards 8 to rotate in a horizontal plane as illustrated by the phantom lines in FIG. 2. In the specific embodiment shown, a guide plate 32 is positioned to extend diagonally over belts 15 and longitudinally over conveyor 18 as shown in FIG. 2 to be engaged by the stack of boards and guide the stack into the proper position on conveyor 18 which then conveys the board stack against gate 30 with the long dimension of the boards extending in the direction of the flow path as desired. This orientation of the boards 8 is maintained until they eventually enter the printer 26 of the finishing machine whose print path 28 will be transverse to the long dimension of the boards as desired. When the conveyor 14 is in the normal mode for conveying the boards 8 without rotating them, all the belts 15 are driven at the same speed, and the guide 32 is removed or pivoted about an axis at 33 (see FIG. 2) to clear the path for the boards.

As described above, when conveyor 14 is in the board-rotating mode, the belts 15 are driven at different speeds. Referring to FIG. 2, starting with the outer belt 15a on the one side of the conveyor, the belts 15 gradually decrease in speed as you move to belt 15b on the opposite side of the conveyor. The belts in between the outer belts 15a and 15b are also driven at a speed proportional to their spacing. For example, if the outer belt 15a is driven 40% faster than the outer belt 15b on the other side, the middle belt would be driven 20% faster than the outer belt 15b. A belt which is spaced ¼ the distance from belt 15a to 15b would be driven at 30% faster than the outer belt 15b. In so doing, a stack of sheets 8 would rotate ninety degrees as it is conveyed on the conveyor 14. Several stretches of belt lengths could be used at a spacing which becomes narrower downstream to more efficiently rotate the stack. Although not shown, this same method of varying speeds of sections of narrow conveyor belt lengths can also be used to rotate sheets in a shingled stream as the stream of sheets are conveyed along the exit conveyor 18.

FIGS. 4 and 5 Embodiment

Referring to FIGS. 4 and 5, there is shown another preferred embodiment of apparatus for rotating the stacks of boards 8 ninety degrees (90°) on their way to the box finishing machine 24 in the event the long dimension of the boards is longer than the length of the feed path 28 of the narrow path digital printer 26 on the box finishing machine 24. Instead of a conveyor like 14 shown in FIGS. 2 and 3 described above, the present embodiment includes a conveyor generally designated 40 which may also be termed a "turntable". The latter includes a set of elongated endless belt conveyors 42 respectively positioned between a set of elongated rollers 44 which project above the surface 48 of the turntable. Conveyors 42 and rollers 44 are mounted on a structure or turntable 46 which is rotatable about a vertical axis to orient them in one of two positions spaced ninety degrees (90°) from each other. When the long dimension of the boards 8 is greater than the print path 28 of the printer 24, the turntable 46 is rotated to position the conveyor belts 42 to extend along the flow path of conveyor 18 and the box finishing machine as shown in FIGS. 4 and 5. When the long dimension of the boards, is less than the print path 28 of the printer 24, the turntable 46 is rotated to place the rollers 44 transverse to the flow path so that the stack of boards 8 will be transferred to conveyor 18 in the same orientation that they were transferred from the elevator 16 to the turntable 40, that is, with their long dimension transverse to the path of flow of conveyor 18 and the box finishing machine 24.

Endless belts 42 are driven in any suitable conventional manner. However in order to drive the stack of boards to conveyor 18, the belts must also be raised as shown in FIG. 5 above the fixed horizontal surfaces 48 and the surfaces of rollers 44 (shown in FIG. 5) to engage the bottom of the board stack. Any suitable mechanism may be employed to so raise and lower belts 42 between operative and idle positions. For example, a mechanism such as disclosed in U.S. Pat. No. 7,635,124 may be employed. The disclosure of this U.S. Pat. No. 7,635,124 is hereby incorporated by reference into the subject application as part hereof. When the rollers 44 are positioned to convey the boards to conveyor 18 in the same orientation existing while on the elevator 16, the belts 42 are of course deactivated and retracted below the turntable surface and the rollers 44.

FIGS. 6, 7 and 8 Embodiment

Referring to FIGS. 6, 7 and 8 there is shown another embodiment of apparatus for rotating the stacks of boards 8 ninety degrees (90°) on their way to the box finishing machine 24. The apparatus includes chute 50 having a frame 73 secured to the floor and which includes eight vertically extending rods 52 to form a path surrounding and guiding the boards as they gradually descend on an elevator 71 through the chute from an upper level where they were moved by a conveyor 60. When elevator 71 descends to a lowermost position shown in FIG. 7, the forward portion of the lowermost board 8 engages on the belt of conveyor 62 and is driven downstream to exit conveyor 70. The process is repeated while the boards are fully stacked in the chute 50 and the elevator 71 gradually descends. Each side of the boards 8 is guided by two rods 52, whose opposite ends are connected to stationary frames, not shown, along a rectangular path. Rods 52 are made from flexible material so that they can be flexed between two modes. In one mode, the rods 52 extend vertically in a generally straight line so that the boards 8 will descend through the chute 50 and on to conveyor 62 without changing their orientation. In the other mode, rods spiral downwards with their opposite ends displaced ninety degrees (90°) from each other so that the boards 8 will be guided by rods 52 into rotation as they descend through the chute and on to conveyor 62 rotated ninety degrees from their position when they entered the top of the chute 50. FIG. 8 graphically illustrates the ninety degree rotation undergone by the sheets 8 as they emerge from the bottom of the chute and on to the conveyor 62. The latter may convey the boards in shingled relationship to one or more exit conveyors 70 or directly to the hopper of a box finishing machine. Rods 52 are manually rotated between their two positions shown in FIG. 8.

Although the present invention has been shown and described above for rotating boards so that they may be accommodated by a narrow path digital printer, the invention may also be used to rotate boards for accommodation by a rotary die cutter or other box finishing devices. In addition the present invention may be used at the exit or downstream end of a box finishing machine to rotate the boards for the next process. It should be apparent that other variations of the present invention will become apparent to those of ordinary skill in the art but without departing from the scope of the present invention appearing in the appended claims.

We claim:

1. A method of conveying a stack of corrugated boards to a box finishing machine including a printer having a print path whose length is less than the length of said boards and extends transverse to a path of conveyance of the boards along said machine, the method comprising the steps of placing a stack of the boards on an elevator, moving the elevator to position the stack in line with a first conveyor means, transferring said stack to said first conveyor means, rotating said stack about a vertical axis into a predetermined position for transfer to a second conveyor means and transferring the rotated stack to said second conveyor means for feeding the stack to a box finishing machine with the length of the boards extending in the direction of the path of conveyance of the box finishing machine.

2. The method defined in claim 1 further including the step of conveying the rotated stack against a gate overlying the second conveyor means to cause the boards to be fed under the gate and subsequently conveyed in an overlapping relationship with each other.

3. The method defined in claim 1 further including the step of moving the elevator to place another stack in line with said first conveyor means for subsequent processing, and repeating this step until all of the boards have been transferred, moving the elevator to a charging position, and replenishing the elevator with another stack of boards for processing in the aforementioned manner.

4. The method defined in claim 1 wherein said stack is rotated ninety degrees to place a long dimension of the boards in the direction of movement of said second conveyor means.

5. The method defined in claim 1 wherein said first conveyor means includes a plurality of endless drive belts, and the belts are driven at different speeds to cause the stack to rotate about a vertical axis.

6. The method defined in claim 5 including the step of rotating the stack against a guide element positioned on said first conveyor means to guide the stack into a predetermined rotated position.

7. The method defined in claim 1 wherein said first conveyor means includes at least one elongated drive belt and at least one roller, and wherein there is included the step of rotating said drive belt and roller about a vertical axis to place one in line with said second conveyor means and the other transverse to the second conveyor means.

8. The method defined in claim 1 wherein said stack is rotated by a turntable.

9. A method of conveying a stack of corrugated boards to a box finishing machine including a printer having a print path whose length is less than the length of said boards and extends transverse to a path of conveyance of the boards along said machine, the method comprising the steps of placing a stack of boards on a first conveyor, rotating said stack on said first conveyor about a vertical axis into a predetermined position for transfer to a second conveyor for feeding the stack to a box finishing machine with the length of the boards extending in the direction of the path of conveyance of the box finishing machine.

10. The method defined in claim 9 wherein said first conveyor includes a plurality of endless drive belts, and the belts are driven at different speeds to cause the stack to rotate about a vertical axis.

11. The method defined in claim 10 including the step of rotating the stack against a guide element positioned on said first conveyor to guide the stack into a predetermined rotated position.

12. The method defined in claim 9 wherein said first conveyor includes at least one elongated drive belt and at least one roller, and wherein there is included the step of rotating said drive belt and roller about a vertical axis to place one in line with said second conveyor and the other transverse to the second conveyor.

13. The method defined in claim 9 wherein said stack is rotated by a turntable.

14. In combination with a box finishing machine including a printer having a print path whose length is less than the length of said boards and extends transverse to a path of conveyance of the boards along said machine, a system for feeding corrugated boards to the box finishing machine comprising a supply area for receiving a stack of corrugated boards, a first conveying means for receiving a stack of corrugated boards from said supply area, a second conveying means for receiving corrugated boards from said first conveying means and conveying them towards said box finishing machine, and wherein said first conveying means includes means for rotating said corrugated boards about a vertical axis and in a horizontal plane with the length of the boards extending in the direction of the path of conveyance of the box finishing machine.

15. The combination defined in claim 14 where said means for rotating said boards includes a plurality of endless conveyor belts extending in side by side relationship, and means for driving said belts at different speeds to rotate said boards in the horizontal plane.

16. The combination defined in claim 15 wherein said means for rotating said boards includes a guide member extending over said first conveying means and engaged with said boards to guide them into a rotated position.

17. The combination defined in claim 16 further including means mounting said guide means for movement between an operative position extending over said first conveying means for guiding the boards into a rotated position and an inoperative position spaced from the boards to allow the boards to be conveyed towards said second conveying means by said first conveying means.

18. The combination defined in claim 14 wherein said means for rotating said corrugated boards includes a turntable rotatable about a vertical axis, said turntable including at least one conveyor belt and at least one roller, said turntable being rotatable between a first position wherein the belt is in alignment with said second conveying means for conveying boards to said second conveying means, and a second position where the roller is in alignment with the second conveying means for conveying boards to said second conveying means.

19. A method of conveying a stack of corrugated boards to a box finishing machine comprising the steps of placing a stack of the boards on an elevator, moving the elevator to position the stack in line with a first conveyor means, transferring said stack to said first conveyor means, rotating said stack into a predetermined position for transfer to a second conveyor means and transferring the rotated stack to said second conveyor means for feeding the stack to a box finishing machine and wherein said stack is rotated as it descends through a vertical chute overlying said second conveyor means.

20. A method of conveying stacks of corrugated boards to a box finishing machine comprising the steps of placing a stack of boards in line with a first conveyor, transferring said stack to said first conveyor, rotating said stack so that said first conveyor will convey said stack in predetermined position for transfer to a second conveyor for feeding the stack to a box finishing machine and wherein said stack is rotated as it descends a vertical chute overlying said second conveyor.

21. In combination with a box finishing machine, a system for feeding corrugated boards to the box finishing machine comprising a supply area for receiving a stack of corrugated boards, a first conveying means for receiving a stack of corrugated boards from said supply area, a second conveying means for receiving corrugated boards from said first conveying means and conveying them towards said box finishing machine, and wherein said first conveying means includes means for rotating said corrugated boards in a horizontal plane, and said means for rotating said boards includes a vertically extending chute for rotating the boards about a vertical axis as they move downwardly through the chute.

22. In combination with a box finishing machine, a system for feeding corrugated boards to the box finishing machine comprising a first conveying means for receiving a stack of corrugated boards, a second conveying means for receiving corrugated boards from said first conveying means and conveying them towards said box finishing machine, and wherein said first conveying means includes means for rotating said corrugated boards in a horizontal plane, and said means for rotating said boards includes a vertically extending chute for rotating the boards about a vertical axis as they move downwardly through the chute.

\* \* \* \* \*